US006449033B2

(12) United States Patent
Marro et al.

(10) Patent No.: US 6,449,033 B2
(45) Date of Patent: *Sep. 10, 2002

(54) APPARATUS AND METHOD FOR MEASURING POLARIZATION DEPENDENT LOSS

(75) Inventors: Marlene A. Marro, Savona, NY (US); William E. Schmitt, Hornell, NY (US); Mark A. Summa, Painted Post, NY (US); Gregory E. Williams, Corning, NY (US)

(73) Assignee: Corning Incorporated, Corning, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,782

(22) Filed: Apr. 26, 1999

(51) Int. Cl.⁷ .............................. G01N 21/00; G01J 4/00
(52) U.S. Cl. ....................................... 356/73.1; 356/364
(58) Field of Search ................................ 385/11, 31, 32, 385/34, 37; 356/364, 367, 369, 73.1; 250/225

(56) References Cited

U.S. PATENT DOCUMENTS

| | | | |
|---|---|---|---|
| 5,371,597 A | | 12/1994 | Favin et al. ................. 356/367 |
| 5,409,545 A | | 4/1995 | Lee et al. ...................... 385/11 |
| 5,440,117 A | * | 8/1995 | Garrett et al. ............... 250/225 |
| 5,481,391 A | | 1/1996 | Giles ........................... 359/179 |
| 5,617,200 A | | 4/1997 | Vance ........................ 356/73.1 |
| 5,619,325 A | | 4/1997 | Yoshida ...................... 356/351 |
| 5,641,956 A | | 6/1997 | Vengsarkar et al. ... 250/227.14 |
| 5,896,196 A | * | 4/1999 | Colbourne et al. .......... 356/124 |
| 5,926,593 A | * | 7/1999 | Asami et al. ................. 385/11 |
| 5,965,874 A | * | 10/1999 | Aso et al. .................... 250/225 |

FOREIGN PATENT DOCUMENTS

| | | |
|---|---|---|
| JP | 07063669 | 10/1995 |
| JP | 09166725 | * 6/1997 |
| JP | 09297063 | 11/1997 |
| JP | 10010359 | * 1/1998 |

OTHER PUBLICATIONS

Polarization Resolved. Complete Characterization of 1310 nm Fiber Pigtailed Multiple–Quantum–Well Optical Amplifiers—Tiemeijer, et al. Journal of Lightwave Tech. vol. 14. No. 6 Jun., 1996.

A new polarization dependent loss measurement system—Bhatti—International Journal Optical, 1997 vol. 11, No. 1, pp. 39–41.

* cited by examiner

*Primary Examiner*—Zandra Smith
(74) *Attorney, Agent, or Firm*—Daniel P. Malley; Eric M. Smith

(57) ABSTRACT

An apparatus for measuring polarization dependent loss is disclosed featuring several fiber optic couplers combined in tandem and oriented such that the PDL noise of the measurement system is reduced to a negligible level. By matching the PDLs of the couplers and vectorally subtracting opposite phases of polarization, the PDL of the measurement system is virtually eliminated. Thus, the PDL noise floor is lowered to near zero and the PDL of the optical device-under-test (DUT) can be accurately measured. The system is relatively inexpensive to implement and offers needed versatility because it measures the PDL of optical devices that operate in a reflection mode or in a forward transmission mode. Thus, it provides one PDL measurement solution for both types of devices.

25 Claims, 4 Drawing Sheets

APPARATUS AND METHOD FOR MEASURING POLARIZATION DEPENDENT LOSS

BACKGROUND OF THE INVENTION

1. Field of the Invention

The present invention relates generally to measuring the polarization dependent loss (PDL) of an optical device, and particularly to an apparatus and method that substantially eliminates the PDL noise associated with the measurement system such that a component PDL can be more accurately measured.

2. Technical Background

In a single mode fiber, the fundamental mode of the fiber is the solution to the wave equation that satisfies the boundary conditions at the core-cladding interface. There are two solutions to the wave equation that correspond to the fundamental mode, both of which have the same propagation constant. These two solutions are referred to as the polarization modes. The electric field associated with the fundamental mode is assumed to be a transverse field, with the polarization components being linearly polarized along mutually orthogonal x and y directions. As light propagates in a fiber or in a component, the energy of the light is divided between the two polarization modes. The state of polarization refers to the distribution of light energy between these two modes. A device or component may exhibit loss as a function of the polarization mode. The difference in the loss between the two polarization modes represents the polarization dependent loss (PDL) of the device. The PDL of an optical component is a critical parameter that is often used to characterize an optical device being incorporated into an optical fiber network. As optical systems become more complex, system designers are requiring that components and devices meet stricter PDL tolerances because of the cumulative nature of PDL. A device having a PDL of 0.01 dB can have a significant impact in a system that consists of many devices and spans a considerable distance. To meet this need, measurement systems must be able to accurately measure the PDL of such devices.

In one approach that has been considered, a 2×2 3 dB coupler is used to make the PDL measurement of a reflective optical device. At one end, a first port is connected to a polarization controller and a laser light source and a second port is connected to a power detector. At the other end, a third port is connected to the device under test (DUT) and the fourth port is terminated. The laser light and polarization controller inject a randomly polarized light signal into the coupler. The light signal is directed out of the third port and into the DUT, where it is reflected back into the third port. After propagating in the coupler, the reflected signal is directed out of the second port and into the detector which detects the PDL. This system has a major drawback. The coupler itself has a PDL in the range between 0.05 db and 0.1 dB. Since the PDL of the coupler is higher than the PDL of many of the devices now being deployed in photonic systems, the measurement apparatus is unable to measure the true PDL of the device under test because it is hidden within the PDL noise of the system.

In another approach that has been considered, an automated system is provided to measure the PDL of optical devices operating in the forward transmission mode. A light source and a polarization controller are used to provide a signal having four predetermined and unique polarization states. The microprocessor based system causes an actuator to cycle the polarization controller through the four polarization states while a detector is positioned at the output of the DUT to read the intensity of each state. These values are used by a processor to compute the values for each element in a Meuller matrix and to compute a Stokes vector to represent the polarized input signal. These values are then used to compute the PDL of the DUT. The test set has a residual PDL of less than 0.001 dB, which is an improvement. Automated systems can be beneficial, provided that the savings generated by the functionality of the system are more than the attendant software, reliability, and maintainability costs which can be considerable. For example, automated systems are software intensive and it is often the case that the cost of software development exceeds the cost of the hardware. Herein lies the drawback of this system. For a sophisticated system that is so highly automated, it lacks versatility since it is unable to measure devices that work in the backward reflection mode, such as gratings. This in turn leads to an unpleasant choice: purchase or develop a second system for measuring the PDL of reflective devices, or redesign and modify the system in order to accomodate reflective devices. Both solutions involve added expense.

Thus, a need exists for a reliable and relatively inexpensive apparatus for accurately measuring the PDL of an optical device. At the same time, the PDL measurement apparatus must be versatile, having the ability to measure the PDLs of both reflective devices and those that function in the forward transmission mode.

SUMMARY OF THE INVENTION

The present invention for an apparatus and method for measuring polarization dependent loss features several fiber optic couplers combined in tandem and oriented such that the PDL noise of the measurement system is reduced to a negligible level. By matching the PDLs of the couplers and vectorally subtracting opposite phases of polarization, the PDL of the measurement system is virtually eliminated. The simplicity of this concept is compelling because it provides a measurement system that accurately measures the PDL of optical components yet in an inexpensive way. It is also a versatile system. It measures the PDL of optical devices that operate in a reflection mode or in a forward transmission mode.

One aspect of the present invention is an apparatus for measuring a polarization dependent loss of an optical device under test using a randomly polarized light signal, the apparatus generates a test input signal that is directed into the optical device under test. The apparatus comprises: a first passive optical element connected to the light source, wherein the first passive optical element has a first polarization dependent loss; and a second passive optical element connected to the first passive optical element and having a second polarization dependent loss that is substantially equal to the first polarization dependent loss. The second passive optical element is disposed relative to the first passive optical element such that the second polarization dependent loss substantially cancels the first polarization dependent loss and outputs the test input signal with a polarization dependent loss equal to a first minimum value.

In another aspect, the present invention includes a method for measuring a polarization dependent loss of an optical device using an apparatus that includes a light source for emitting a light signal that is randomly polarized, a first passive optical element connected to the light source, wherein the first passive optical element has a first polarization dependent loss. The method for measuring includes the steps of: providing a second passive optical element having a second polarization dependent loss that is substantially equal to the first polarization dependent loss and connected to the first passive optical element at a relative position such that the second polarization dependent loss substantially cancels the first polarization dependent loss; directing the light signal into the first passive optical component such that the second passive optical component produces a test input signal, wherein the test input signal has a polarization dependent loss substantially equal to a first minimum value; directing the test input signal into the optical device; and measuring an output signal of the optical device to thereby determine the polarization dependent loss.

In another aspect, the present invention includes a method for calibrating an apparatus used for measuring a polarization dependent loss of an optical device, the apparatus includes a light source for emitting a light signal that is randomly polarized and a first passive optical element having a first polarization dependent loss. The method for calibrating comprising the steps of: providing a second passive optical element having a second polarization dependent loss that is substantially equal to the first polarization dependent loss and connected to the first passive optical element; directing the light signal into the first passive optical component to thereby create. a calibration signal that exits the second passive optical component; and rotating the second passive optical component until a first calibration polarization dependent loss of the calibration signal equals a first minimum value.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
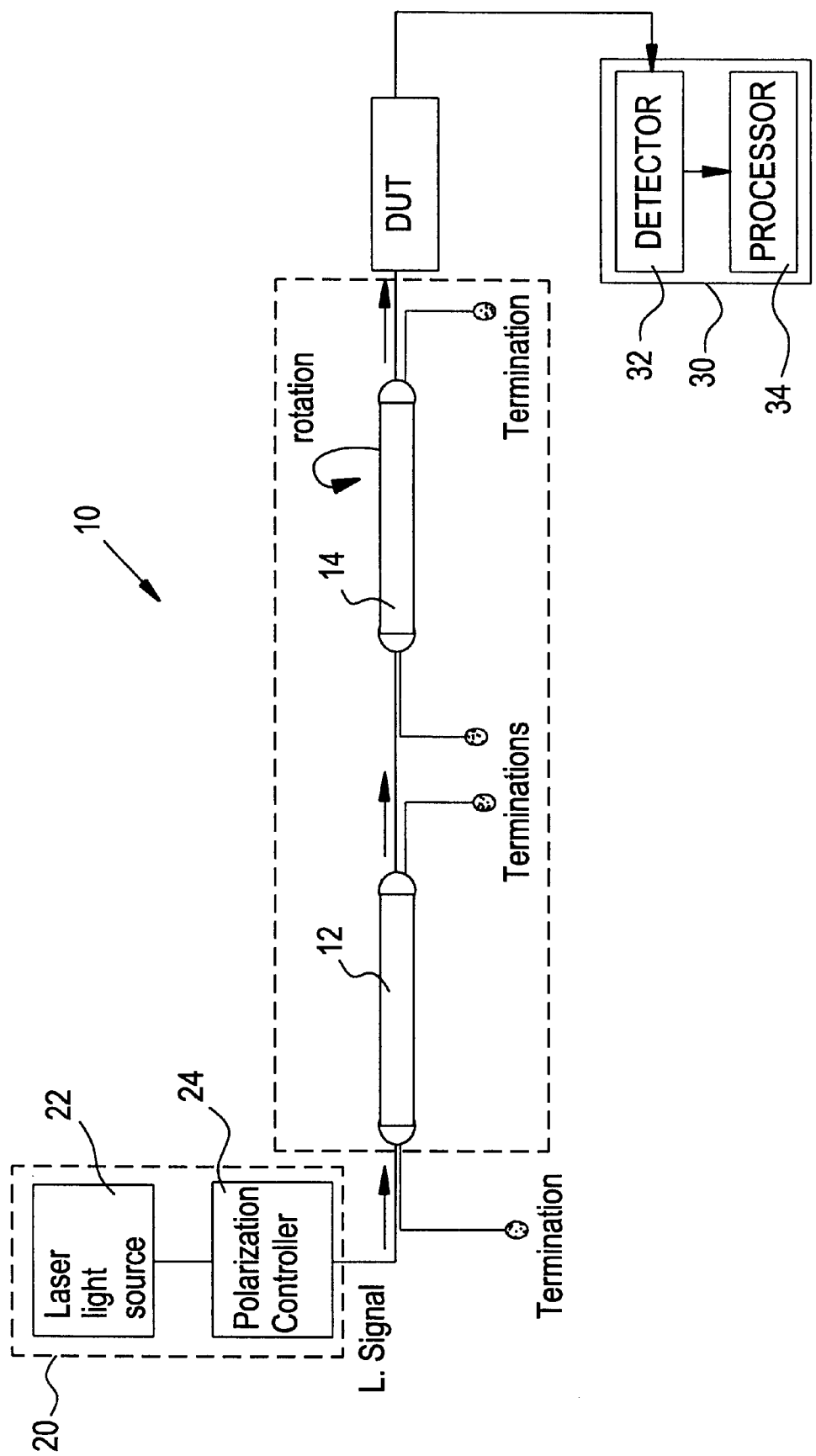
FIG. 1 is a block diagram of a first embodiment of the present invention that measures PDL in a forward transmission mode.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the apparatus for measuring polarization dependent loss of the present invention is shown in FIG. 1, and is designated generally throughout by reference numeral 10.

In accordance with the invention, the present invention for an apparatus for measuring polarization dependent loss includes a first passive optical component 12 and a second passive optical component 14. The PDLs of these components are substantially equal. The second passive optical component 14 is connected to the first passive optical component 12 and rotated with respect to the first passive component 12. By matching the PDLs of the first and second passive optical components 12 and 14, and vectorally subtracting opposite phases of the PDL through rotation, the PDL of the measurement system is virtually eliminated. Thus, the noise floor is lowered to near zero and the PDL of the optical device-under-test (DUT) can be accurately measured. The system is relatively inexpensive to implement and offers needed versatility because it measures the PDL of optical devices that operate in a reflection mode or in a forward transmission mode. Thus, it provides one solution for both types of measurements.

As embodied herein, and depicted in FIG. 1, a first embodiment of the present invention operating in the forward transmission mode includes light source 20 connected to passive optical component 12. Passive optical component 12 is connected to passive optical component 14. As discussed above, the second passive optical component 14 is rotated with respect to the first passive component 12 until the PDL of the second passive optical component cancels the PDL of the first passive optical component. The rotation of the second passive optical component 14 is effected as a part of the calibration of apparatus 10 and will be discussed below. An output of passive optical component 14 is connected to the DUT. The output of the DUT is connected to measurement element 30. The DUT being tested in the first embodiment can be any optical device that operates in a forward transmission mode, such as couplers, Mach-Zehnders, and other such devices.

Light source 20 consists of a narrow band light source 22 connected to polarization controller 24. Narrow band light source 22 is selected to operate in either the 0.8 $\mu$m, 1.3 $\mu$m, or 1.55 $\mu$m optical communication wavelength bands depending on the DUT and the intended use of the DUT.

Narrow band light source 22 may be of any suitable well-known type, but there is shown by way of example a HP8168F laser. It will be apparent to those of ordinary skill in the pertinent art that modifications and variations can be made to the narrow band light source 22 depending on apparatus cost restraints, wavelength, and device availability. For example, any laser with a narrow spectral line width is suitable. Also, light source 22 can be implemented by replacing the laser with a combination of a broadband light source, such as a light emitting diode, and a narrowband filter. Polarization controller 24 may be of any suitable well-known type, but there is shown by way of example an HP8169A manufactured by Hewlett-Packard.

Passive optical component 12 and passive optical component 14 may be of any suitable well-known type, but there is shown by way of example a 2×2 3 dB coupler for each passive component. It will be apparent to those of ordinary skill in the pertinent art that modifications and variations can be made to passive components 12 and 14 of the present invention depending on the number of ports needed. For example, 1×2 3 dB couplers can also be used. The only requirement is that the PDL of coupler 14 be matched to the PDL of coupler 12. Passive optical component 14 can also be implemented using a 1×1 device such as a manual polarization controller.

Measurement element 30 consists of a detector 32 and a processor 34. The detector 32 may be of any suitable well-known type, but there is shown by way of example an HP81524A/B detector. It will be apparent to those of ordinary skill in the pertinent art that modifications and variations can be made to detector 32 depending on the desired level of complexity of the measurement apparatus 10. For example, any suitable power meter can be used to detect the intensity of the light signal exiting the DUT. The processor 34 may be of any suitable well-known type, but there is shown by way of example a personal computer or a workstation using a standard computer communications interface, such as an EEE-488 interface. Intensity values of the light exiting the DUT are measured by detector 32 and transmitted to processor 34. The PDL of the device is calculated and displayed.

Figure 2:
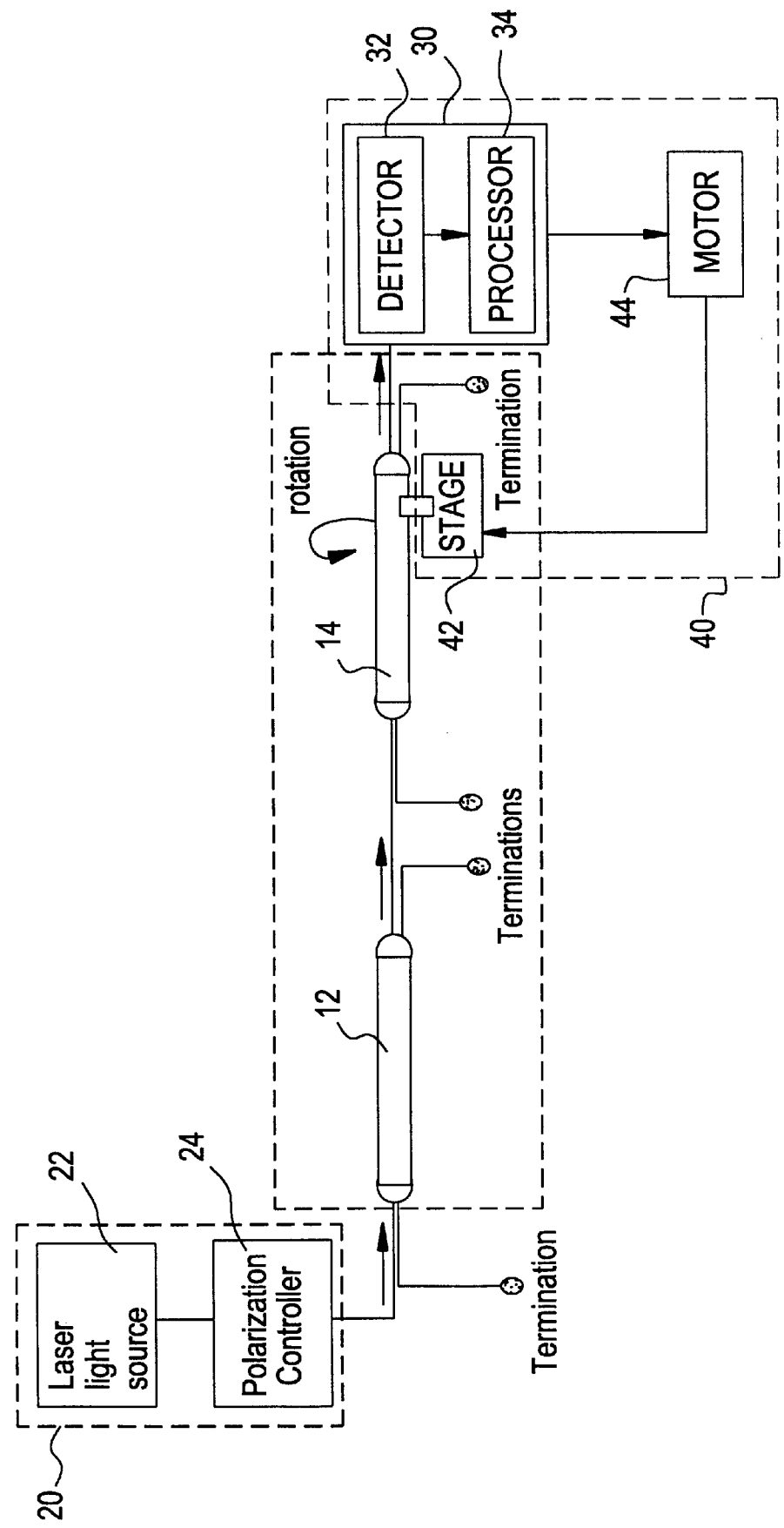
FIG. 2 is a block diagram of the calibration assembly used for calibrating the present invention for forward transmission mode measurements.

In accordance with the invention, and as depicted in FIG. 2, the present invention for an apparatus for measuring polarization dependent loss 10 may further include a calibration unit 40 for calibrating the PDL measurements in a forward transmission mode. Calibration unit 40 includes rotatable stage assembly 42 which positions passive optical component 14 relative to passive optical component 12. Rotatable stage assembly 42 is connected to and driven by motor 44. Motor 44 is controlled by the measurement element 30, which functions as a loop controller in calibration unit 40. Measurement element 30 is connected to passive optical component 14, to form a closed control loop.

Rotatable stage assembly 42 may be of any suitable well-known type, but there is shown by way of example a rotation stage assembly manufactured by Newport. It will be apparent to those of ordinary skill in the pertinent art that modifications and variations can be made to stage assembly 40 depending on cost and precision requirements. For example, Newfocus also manufactures rotation stage assemblies.

Motor 44 may be of any suitable well-known type, but there is shown by way of example a stepper motor that drives rotatable assembly 42 in incremental steps. It will be apparent to those of ordinary skill in the pertinent art that modifications and variations can be made to stage assembly 40 depending on cost and measurement needs. For example, a continuous drive motor having variable speeds could also be used.

One of ordinary skill in the art will recognize that the measurement software routine and the calibration software routine are portions of a software program resident in the memory of the processor 34.

EXAMPLE 1

The invention will be further clarified by the following example which is intended to be exemplary of the invention. Coupler 12 is a 2×2 3 dB coupler having a PDL of 0.029 dB and an achromatic spectral response in the 1.5 μm optical communications band. Coupler 14 is a 2×2 3 dB coupler having a PDL of 0.032 dB and an achromatic spectral response in the 1.5 μm optical communications band. Thus, the minimum value of the residual PDL is 0.003 dB. Of course, couplers 12 and 14 could have been selected such that their PDLs were matched to a thousandth of a dB. This would reduce the residual PDL to less than 0.001 dB.

During calibration, laser 22 emits a narrow band signal having a center wavelength within the 1.5 μm band. Polarization controller 24 randomizes the light through all states of polarization and the resultant calibration signal is directed into coupler 12. The calibration signal propagates through couplers 12 and 14 and is detected by measurement element 30. Measurement element 30 calculates the residual PDL using the equation:

$$PDL = \text{Log}_{10}\left[\frac{P_{out\,max}}{P_{in}}\right] - \text{Log}_{10}\left[\frac{P_{out\,min}}{P_{in}}\right] \quad (1)$$

Measurement element 30 uses the measured PDL value as an error signal to drive motor 44 and rotate stage 42. Thus, as stage assembly 42 rotates coupler 14 with respect to coupler 12, the measured residual PDL changes and measurement element 30 drives motor 44 and stage 42 until the PDL is nulled or reaches a minimum value. If couplers 12 and 14 are perfectly matched the residual PDL will be lowered to near zero. If couplers 12 and 14 are not perfectly matched, there will be a minimum value. In the above example, the residual PDL has a minimum value of 0.003 dB. Thus, measurement element 30 compares this value with the measured value to ensure that the measured value is nulled or minimized. This information would also be available for diagnostic purposes to evaluate the performance of the calibrating assembly 40. Once the PDL is nulled, coupler 14 is fixed in place and the measurement routine is performed. At this point, measurement element 30 is replaced by the DUT and the output of the DUT is connected to measurement element 30, as depicted in FIG. 1.

Subsequently, laser 22 emits a narrow band signal having a center wavelength within the 1.5 μm band. Polarization controller 24 randomizes the light through all states of polarization and the resultant light signal is directed into coupler 12. The light signal propagates through couplers 12 and 14. As discussed above, the calibration has the effect of eliminating the PDL noise inherent in coupler 12 and coupler 14. Thus, the test input signal that exits coupler 14 and is directed into the DUT only carries a neglible amount of PDL. The test signal propagates in the DUT and the output of the DUT is directed into measurement element 30. Measurement element 30 calculates the composite PDL of the DUT output signal using equation (1), above. The PDL of the DUT is calculated using the equation:

$$PDL = CPDL - RPDL \quad (2)$$

wherein PDL equals the PDL of the DUT, CPDL refers to the composite PDL, and RPDL is the residual PDL. If the PDL of coupler 12 and the PDL of coupler 14 are not perfectly matched, the test input signal will carry the residual PDL noise even after calibration. Since PDLs are additive, this residual PDL noise must be subtracted from the composite PDL measured at the output of the DUT.

Figure 3:
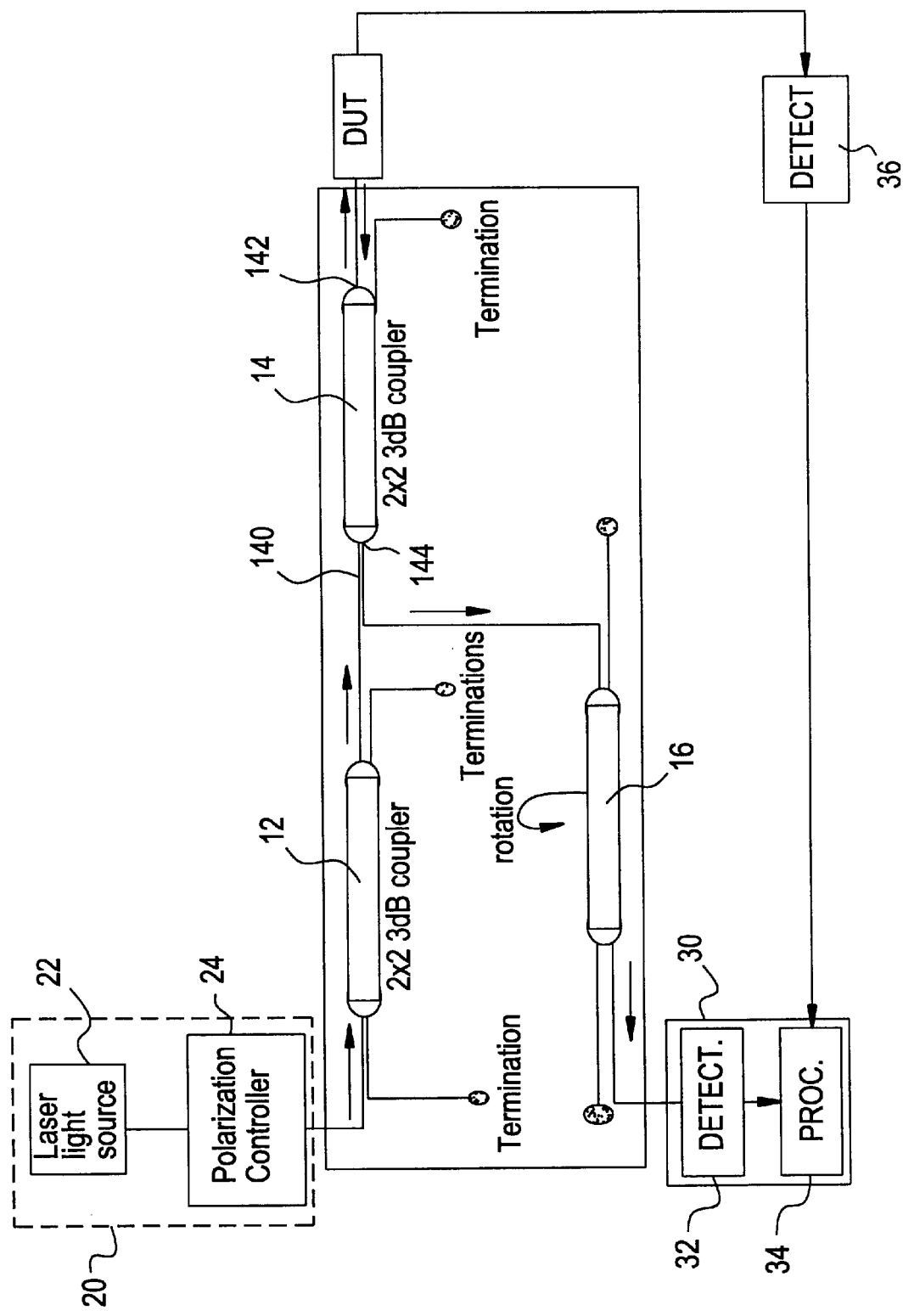
FIG. 3 is a block diagram of an alternate embodiment of the present invention that measures PDL in a reflection mode.

In an alternate embodiment of the invention, as embodied herein and as shown in FIG. 3, the present invention operates in both a forward transmission mode and a backward reflection mode. Thus, it can detect and measure the PDL of a Mach-Zehnder in both a forward transmission mode and a backward reflection mode. It can also measure the PDL of reflecting devices such as gratings and the like. Apparatus 10 includes light source 20 connected to coupler 12. Coupler 12 is connected to port 140 of coupler 14. As discussed above, coupler 14 is rotated with respect to coupler 12 until the PDL of coupler 14 cancels the PDL of coupler 12. The rotation of the coupler 14 is effected as a part of the calibration routine that was discussed above. Port 142 of coupler 14 is connected to the DUT. Thus, the reflected signal is directed back into port 142 and exits port 144 of coupler 14. Port 144 is connected to passive optical component 16. Passive optical component 16 is rotated with respect to coupler 14 in the same way as coupler 14 is rotated with respect to coupler 12. Passive optical component 16 is rotated with respect to coupler 14 until the PDL of passive optical component 16 cancels the PDL of coupler 14. The rotation of the passive optical component 16 is effected as a part of the calibration of the second embodiment apparatus 10, and will be discussed below. An output of passive optical component 16 is connected to measurement element 30. Measurement element 30 may also include detector 36 which detects the light exiting the DUT in a forward transmission mode. Detector 36 is connected to processor 34. Thus, measurement element 30 is able to calculate the PDL in a forward and backward transmission mode simultaneously.

Passive optical component 16 may be of any suitable well-known type, but there is shown by way of example a 2×2 3 dB coupler. It will be apparent to those of ordinary skill in the pertinent art that modifications and variations can be made to passive optical component 16 of the present invention depending on the number of ports needed. For example, 1×2 3 dB couplers can also be used. Any off-the shelf coupler is suitable. The only requirement is that the PDL of coupler 16 be matched to the PDL of coupler 14. Passive optical component 16 can also be implemented using a 1×1 device such as a manual polarization controller. Light source 20, coupler 12, coupler 14, and measurement element 30 were discussed above with respect to the first embodiment.

Figure 4:
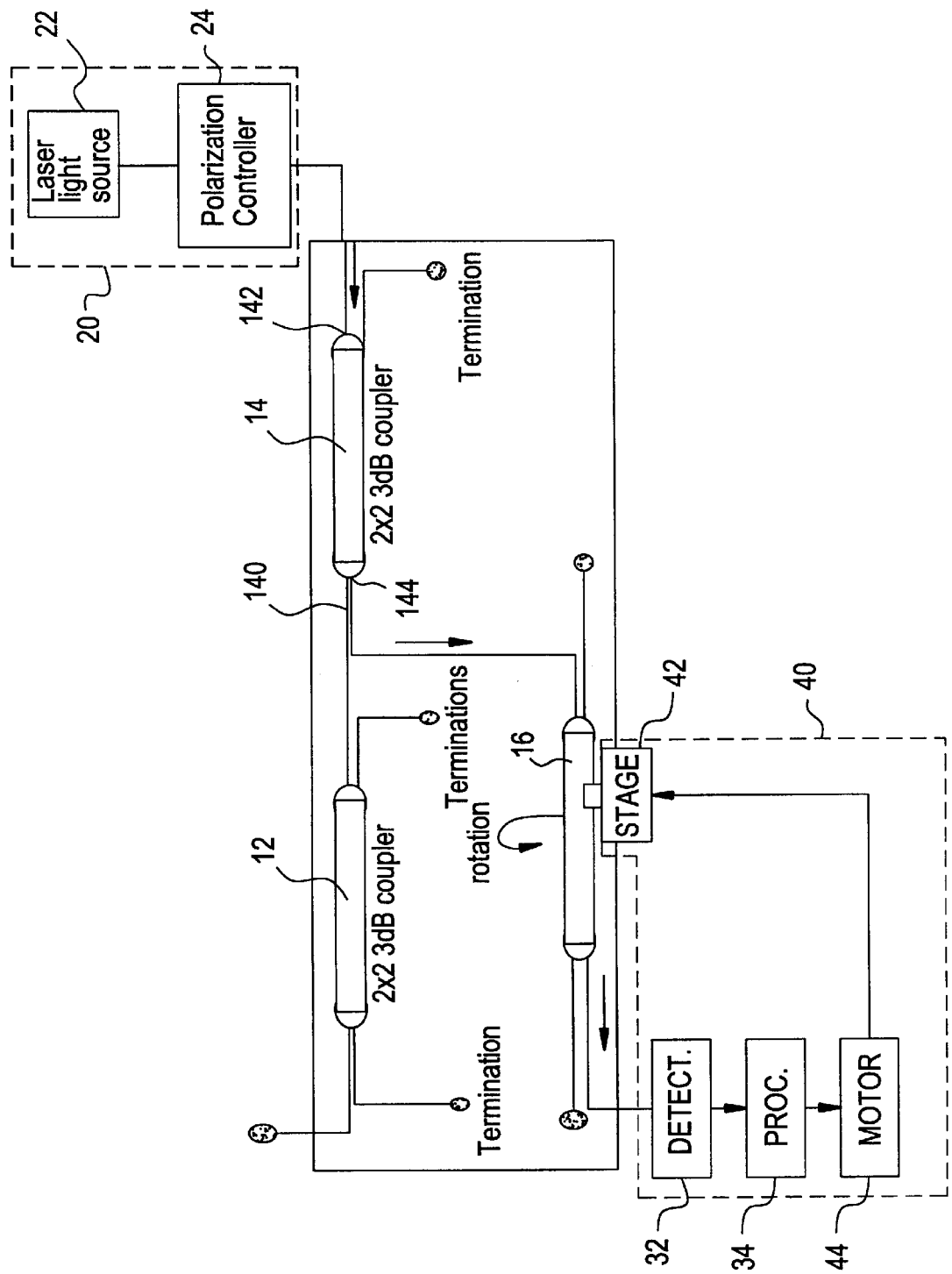
FIG. 4 is a block diagram of the calibration assembly for calibrating the present invention for backward reflection mode measurements.

In accordance with the invention, and as depicted in FIG. 4, the second embodiment of the present invention may further include a calibration unit 40 for calibrating the backward reflection PDL measurement. Calibration unit 40 which includes stage assembly 42, motor 44, and measurement element 30 is identical to calibration unit 40 discussed above with respect to the forward transmission PDL measurement and the method of calibrating is likewise identical to the method of calibrating the forward transmission PDL measurement discussed above.

EXAMPLE 2

The second embodiment of the invention will be further clarified by the following example which is intended to be exemplary of the invention. Coupler 12 is a 2×2 3 dB coupler having a PDL of 0.029 dB and an achromatic spectral response in the 1.5 $\mu$m optical communications band. Coupler 14 is a 2×2 3 dB coupler having a PDL of 0.032 dB and an achromatic spectral response in the 1.51 $\mu$m optical communications band. Thus, the minimum value of the residual PDL between the coupler 12 and coupler 14 is 0.003 dB. Coupler 16 is a 2×2 3 dB coupler having a PDL of 0.026 dB and an achromatic spectral response in the 1.5 $\mu$m optical communications band. Thus, the minimum value of the residual PDL between the coupler 14 and coupler 16 is 0.006 dB. Of course, couplers 12 and 14 or, 14 and 16 could have been selected such that their PDLs were matched to a thousandth of a dB. Selecting the couplers in this way would reduce the residual PDLs to less than 0.001 dB.

The calibration of the second embodiment is depicted in FIG. 4. The calibration of coupler 14 was discussed above with respect to the first embodiment, and is identical for the second embodiment. The calibration of the second embodiment also includes the step of calibrating coupler 16. During the calibration of coupler 16, laser 22 emits a narrow band signal having a center wavelength within the 1.5 $\mu$m band. Polarization controller 24 randomizes the light through all states of polarization and the resultant calibration signal is directed into port 142 of coupler 14 to simulate a reflected signal. The calibration signal propagates through couplers 14 and 16 and is detected by measurement element 30. Measurement element 30 calculates the residual PDL using equation (1) given above. Thus, if couplers 14 and 16 are perfectly matched a residual PDL measured by measurement element 30 will be lowered to near zero. If couplers 12 and 14 are not perfectly matched, there will be a minimum value. In this case, the residual PDL between coupler 14 and coupler 16 is 0.006 dB. Once the PDL is nulled or minimized, coupler 16 is fixed in place for the measurement of the DUT.

As depicted in FIG. 3, light source 20 is disconnected from coupler 14 and connected to coupler 12. Coupler 14 is connected to the DUT. Subsequently, laser 22 emits a narrow band signal and polarization controller 24 randomizes the light through all states of polarization and the resultant light signal is directed into coupler 12. The light signal propagates through couplers 12 and 14. As discussed above, the calibration has the effect of eliminating the PDL noise inherent in coupler 12 and coupler 14. Thus, the test input signal that exits coupler 14 and is directed into the DUT only carries a neglible amount of PDL. The test signal is reflected by the DUT and directed into port 142 of coupler 14. Coupler 14 directs the light signal into coupler 16 from port 144. A test output signal exits coupler 16 and is directed into measurement element 30. Measurement element 30 calculates the PDL of the DUT reflected signal using equation (1), above. The PDL of the DUT is calculated using equation (2).

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An apparatus for measuring a polarization dependent loss of an optical device under test using a randomly polarized light signal, said apparatus generating a test input signal that is directed into said optical device under test, said apparatus comprising:

a first passive optical element connected to said light source, wherein said first passive optical element has a first polarization dependent loss;

a second passive optical element connected to said first passive optical element and having a second polarization dependent loss that is substantially equal to said first polarization dependent loss, said second passive optical element being disposed relative to said first passive optical element such that the second polarization dependent loss substantially cancels the first polarization dependent loss and outputs the test input signal with a polarization dependent loss equal to a first minimum value;

a measurement element connected to the output of the optical device under test for measuring the device output signal and calculating the optical device under test polarization dependent loss; and a calibration assembly connected to the second passive optical component for calibrating a measurement in a forward transmission mode, said calibration assembly rotates the second passive optical component in response to a calibration signal to thereby cause the second polarization dependent loss to substantially cancel the first polarization dependent loss.

2. The apparatus according to claim 1, wherein the measurement element further comprises:
   a light detector connected to the device under test; and
   a computing device connected to said light detector, said computing device includes a software program having a measurement routine and a calibration routine.

3. An apparatus for measuring a polarization dependent loss of an optical device under test using a randomly polarized light signal, said apparatus generating a test input signal that is directed into said optical device under test, said apparatus comprising:
   a first passive optical element connected to said light source, wherein said first passive optical element has a first polarization dependent loss; and
   a second passive optical element connected to said first passive optical element and having a second polarization dependent loss that is substantially equal to said first polarization dependent loss, said second passive optical element being disposed relative to said first passive optical element such that the second polarization dependent loss substantially cancels the first polarization dependent loss and outputs the test input signal with a polarization dependent loss equal to a first minimum value;
   wherein the first minimum value equals the absolute value of the first polarization dependent loss minus the second polarization dependent loss.

4. The apparatus according to claim 3, wherein the first minimum value is less than 0.001 dB.

5. An apparatus for measuring a polarization dependent loss of an optical device under test using a randomly polarized light signal, said apparatus generating a test input signal that is directed into said optical device under test, said apparatus comprising:
   a first passive optical element connected to said light source, wherein said first passive optical element has a first polarization dependent loss; and
   a second passive optical element connected to said first passive optical element and having a second polarization dependent loss that is substantially equal to said first polarization dependent loss, said second passive optical element being disposed relative to said first passive optical element such that the second polarization dependent loss substantially cancels the first polarization dependent loss and outputs the test input signal with a polarization dependent loss equal to a first minimum value;
   wherein the test input signal is reflected by the optical device into the second passive optical component to thereby generate a test output signal that is directed into an output of the second passive optical component.

6. The apparatus according to claim 5, further comprising:
   a third passive optical component connected to the output of the second passive optical component and having a third polarization dependent loss substantially equal to said second polarization loss, said third passive optical component being disposed relative to the second passive optical component such that the third polarization dependent loss cancels the second polarization dependent loss to thereby cause the test output signal to have a polarization dependent loss substantially equal to a second minimum value.

7. The apparatus according to claim 5, wherein the second minimum value equals the absolute value of the second polarization dependent loss minus the third polarization dependent loss.

8. The apparatus according to claim 7, wherein the second minimum value is less than 0.001 dB.

9. The apparatus according to claim 6, wherein the first passive optical component, the second passive optical component, and the third passive optical component are couplers.

10. The apparatus according to claim 6, further comprising:
    a measurement element connected to the third passive optical component for measuring the test output signal and calculating an optical device under test polarization dependent loss; and
    a calibration assembly connected to the second passive optical component and the third passive optical device for calibrating a measurement in a forward transmission mode and a backward reflection mode.

11. The apparatus according to claim 10, wherein the measurement device further comprises:
    a light detector connected to the device under test; and
    a computing device connected to said light detector, said computing device includes a software program having a measurement routine and a calibration routine.

12. The apparatus according to claim 11, wherein the measurement device calculates a test output signal polarization dependent loss by solving:

$$PDL = \text{Log}_{10}\left[\frac{P_{out\,max}}{P_{in}}\right] - \text{Log}_{10}\left[\frac{P_{out\,min}}{P_{in}}\right]$$

wherein PDL is said test output signal polarization dependent loss in decibels, $P_{out\,max}$ is the maximum power of the test output signal, $P_{out\,min}$ is the minimum power of the test output signal, and $P_{in}$ is the power of the test input signal.

13. The apparatus according to claim 12, wherein the optical device under test polarization dependent loss equals the test output signal polarization dependent loss minus the second minimum value.

14. The apparatus according to claim 10, wherein the calibration assembly further comprises:
    a rotatable stage assembly for rotating the second passive optical component in the forward transmission calibration mode and the third passive optical component in the backward reflection calibration mode; and
    a motor assembly for actuating said rotatable stage assembly in response to a signal from the measurement element, wherein said rotatable stage, said motor assembly, and the measurement element form a control loop during the forward transmission calibration mode and the backward reflection calibration mode.

15. The apparatus according to claim 14, wherein the measurement element drives the motor to cause the second passive optical component to rotate with respect to said first passive optical element until the polarization dependent loss of the calibration signal is substantially equal to the first minimum value.

16. The apparatus according to claim 15, wherein the first minimum value equals the absolute value of the first polarization dependent loss minus the second polarization dependent loss.

17. The apparatus according to claim 14, wherein the measurement element drives the motor causing the third passive optical component to rotate with respect to said second passive optical element until the polarization dependent loss of the calibration signal is substantially equal to the second minimum value.

18. The apparatus according to claim 14, wherein the measurement element is optically connected to the second passive optical component in the forward transmission calibration mode and optically connected to the third passive optical component in the backward reflection calibration mode to thereby measure a calibration signal power and generate an error signal based on said calibration signal power, wherein the measurement element drives the motor assembly until said error signal equals a first minimum value in the forward transmission calibration mode and a second minimum value in the backward reflection calibration mode.

19. A method for measuring a polarization dependent loss of an optical device, in an apparatus including a light source for emitting a light signal that is randomly polarized, a first passive optical element connected to said light source, wherein said first passive optical element has a first polarization dependent loss, said method for measuring comprising the steps of:

providing a second passive optical element having a second polarization dependent loss that is substantially equal to the first polarization dependent loss and connected to the first passive optical element at a relative position such that said second polarization dependent loss substantially cancels the first polarization dependent loss;

directing the light signal into the first passive optical component such that said second passive optical component produces a test input signal, wherein said test input signal has a polarization dependent loss substantially equal to a first minimum value;

directing said test input signal into the optical device; and measuring an output signal of the optical device to thereby determine the polarization dependent loss.

20. The method according to claim 19, wherein the first minimum value equals the absolute value of the first polarization dependent loss minus the second polarization dependent loss.

21. The method according to claim 19, further comprising the steps of:

providing a third passive optical element having a third polarization dependent loss that is substantially equal to the second polarization dependent loss and connected to the second passive optical element at a rotated position such that said third polarization dependent loss substantially cancels the second polarization dependent loss;

directing a test output signal into the second passive optical component, wherein said test output signal is generated by reflecting the test input signal off of the optical device under test;

measuring said test output signal at an output of said third passive optical component to thereby generate test output measurements; and calculating the polarization dependent loss using said test output measurements.

22. A method for calibrating an apparatus used for measuring a polarization dependent loss of an optical device, said apparatus including a light source for emitting a light signal that is randomly polarized and a first passive optical element having a first polarization dependent loss, said method for calibrating comprising the steps of:

providing a second passive optical element having a second polarization dependent loss that is substantially equal to the first polarization dependent loss and connected to the first passive optical element;

directing the light signal into the first passive optical component to thereby create a calibration signal that exits said, second passive optical component; and rotating said second passive optical component until said second polarization dependent loss substantially cancels the first polarization dependent loss and a first calibration polarization dependent loss of said first calibration signal equals a first minimum value.

23. The method according to claim 22, wherein the first minimum value equals the absolute value of the first polarization dependent loss minus the second polarization dependent loss.

24. The method according to claim 22, further comprising the steps of:

providing a third passive optical element having a third polarization dependent loss that is substantially equal to the second polarization dependent loss and connected to the second passive optical element;

directing the light signal into the second passive optical component such that a second calibration signal exits said third passive optical component; and rotating said third passive optical component until said third polarization dependent loss substantially cancels the second polarization dependent loss and a second calibration polarization dependent loss of said second calibration signal equals a second minimum value.

25. The method according to claim 24, wherein the second minimum value equals the absolute value of the second polarization dependent loss minus the third polarization dependent loss.

* * * * *